United States Patent [19]

Kosaka

[11] 4,230,776

[45] Oct. 28, 1980

[54] THERMOSENSITIVE RECORDING PAPER IMPROVED IN PRINTING QUALITY

[75] Inventor: Takao Kosaka, Takasago, Japan

[73] Assignee: Mitsubishi Paper Mills, Ltd., Tokyo, Japan

[21] Appl. No.: 969,497

[22] Filed: Dec. 14, 1978

[30] Foreign Application Priority Data

Dec. 16, 1977 [JP] Japan ................................ 52-151383

[51] Int. Cl.3 ................................................ B32B 21/04

[52] U.S. Cl. .................................... 428/537; 428/488; 428/913; 430/964

[58] Field of Search ................ 428/537, 532, 913, 488

[56] References Cited

U.S. PATENT DOCUMENTS

| | | | |
|---|---|---|---|
| 3,811,914 | 5/1974 | Saito et al. | 428/537 |
| 3,988,501 | 10/1976 | Knirsch et al. | 428/537 |
| 4,032,690 | 6/1977 | Kohmura et al. | 428/537 |
| 4,098,948 | 7/1978 | Skelly et al. | 428/537 |

*Primary Examiner*—Travis Brown
*Attorney, Agent, or Firm*—Cushman, Darby & Cushman

[57] ABSTRACT

The thermosensitive recording paper comprising a support and, supported thereon, a combination of a colorless or slightly colored lactone compound color former and a phenolic compound capable of rendering said lactone compound to develop color, is improved in its printing quality in that said support is an undercoated paper.

2 Claims, No Drawings

THERMOSENSITIVE RECORDING PAPER IMPROVED IN PRINTING QUALITY

This invention relates to a thermosensitive paper which is improved in the printing quality by coating on an undercoated paper support a thermosensitive layer containing a generally colorless or slightly colored color-forming compound and a phenolic compound capable of developing color when brought into contact with said color-forming compound by application of heat.

It has long been known that a color is developed by the reaction between a color-forming lactone compound such as crystal violet lactone and a phenolic compound. The utilization of such a reaction in a thermosensitive paper has also been known as described, for example, in Japanese Patent Publication No. 14,039/70.

In preparing a thermosensitive recording paper, a colorless or pale-colored substance capable of forming color and a phenolic compound are finely dispersed separately in respective aqueous media, the resulting dispersions are mixed and, if necessary, admixed with defoamers, penetrants such as surface active agents, waxes, clays, raw starch, and binders. The resulting thermosensitive coating liquid is coated on a support, dried, and subjected to special surface treatment to improve the surface smoothness.

Generally, when a thermosensitive paper is used in a thermal printing system, color is developed by contacting the paper with a thermal head momentarily heated by electric current. If the contact is unsatisfactory, the heat transfer becomes insufficient owing to the heat diffusion or the heat loss due to the intervened air. Accordingly, in such a case, on thermal printing with a definite amount of heat supplied to the thermal head, the developed color density becomes too low or lacks in uniformity, rendering the imprint illegible, as contrasted to the case where satisfactory contact is established.

In actual practice, in order to improve the above disadvantage, the paper support coated with a thermosensitive layer is generally surface-treated by supercalendering or the like to impart a Bekk smoothness (JIS P 8119) of 200 to 1,000 seconds. Although this treatment is considerably effective, it is still unsatisfactory in achieving sufficient image density at high-speed printing or in the quality of printed image.

The present inventor found, as a result of various experiments, that an improvement in the image density as well as in the quality of the image at high-speed printing can be achieved by coating the thermosensitive layer on an undercoated paper in place of the customary paper support.

Since the customary paper support is composed of cellulose fibers, the surface irregularities are marked in comparison with the dimensions of each heating element (e.g. a rectangle of $200\mu \times 400\mu$). Although a smooth surface is obtained by the surface treatment by supercalendering the support coated with a thermosensitive layer, the thickness of the coating layer locally varies, resulting in non-uniform image density or non-uniform contact between the heating element and the thermosensitive paper leading to inacurate reproduction of the shape of each heater dot. By the use of an undercoated paper support, it becomes possible to obtain a more uniform coating layer and better contact of the heating element with the thermosensitive paper, resulting in improvement in the printed image density and the image quality. In this connection, it is conceivable to coat the thermosensitive layer on a film of synthetic resins such as polyethylene, polypropylene, polyethylene terephthalate, and the like. However, the synthetic resin film is unsuitable for practical use, because its disposal presents a problem.

The undercoated paper used as support in this invention can be an art paper for use in general printing or a coated paper. Examples of such paper supports include cast-coated papers with specular finish for high-grade printing, and resin-coated papers and baryta paper used in photographic printing paper, all having a Bekk smoothness of 80 seconds or more. Of these papers, in view of the reproducibility of heater dots, the most recommendable is a so-called cast-coated paper which is manufactured by reproducing the polished surface of a chromium-plated casting drum onto a semi-dried coating layer. Examples of useful commercial products are "LK", "Mirror Coat", "Crystal Coat", "Gloria Coat", and "Luster Coat".

The baryta paper, resin-coated paper and cast-coated paper, as herein referred to, are well known to the art and are prepared by coating wood free paper with, respectively, a baryta-binder mixture, synthetic resins such as polyethylene, and a mixture of pigment and binder. All of these papers have a Bekk smoothness of 80 seconds or more. The coating rate is in the range of 5 to 50 $g/m^2$ on dry basis. The coated paper specifically called cast-coated paper in the art is a high-gloss paper having a gloss value of 15 or more, as expressed in terms of the ratio (in %) of specularly reflected to incident light flux at an incident angle of 20 degrees.

Typical examples of colorless or pale-colored color formers are listed below, but the invention is not limited to the examples.

Crystal violet lactone, malachite green lactone, 3,3-bis(p-dimethylaminophenyl)-4,5,6,7-tetrachlorophthalide, benzo-β-naphthospiropirane, 3-methyl-di-β-naphthospiropyrane, 1,3,3-trimethyl-6'-chloro-8'-methoxyindolinobenzospiropyrane, N-phenyl-rhodamine lactam, 3-ethylamino6-chlorofuorane, 3-morpholino-5,6-benzofluorane, 3-diethylamino-6-methyl-7-chlorofluorane, 3-diethylamino-6,7-dimethylfluorane, 3-diethylamino-7,8-benzofluorane, 3-diethylamino-6-methoxyfluorane, 3-diethylamino-7-dibenzylaminofluorane, 3-diethylamino-7-anilinofluorane, 3-diethylamino-5,6-benzo-7-benzylaminofluorane, 3-piperidino-6-methyl-7-anilinofluorane, 3-pyrrolidino-6-methyl-7-anilinofluorane, 3-N-ethyltolylamino-6-methyl-7-anilinofluorane, and 3-diethylamino-7-(N-3-trifluoromethylphenyl-)aminofluorane.

The phenolic substances used in this invention are those which liquify or vaporise at room temperature or higher temperatures, preferably at a temperature of 70° C. or higher, and react with the above-said color formers to develop color. Examples of such phenolic substances include 4,4'-isopropylidenediphenol, 4,4'-isopropylidenebis(2-chlorophenol), 4,4'-isopropylidenebis(2-tert-butylphenol), 4,4'-sec-butylidenediphenol, 4,4'-cyclohexylidenediphenol, 4-phenylphenol, 4-hydroxydiphenoxide, methyl 4-hydroxybenzoate, phenyl 4-hydroxybenzoate, 4-hydroxyacetophenone, salicylic anilide, novolac-type phenol resins, halogenated novolac-type phenol resins, α-naphthol, β-naphthol, and 2,2-bis(4-hydroxyphenyl)-n-heptane. The examples, however, are merely illustrative and not limitative. Of the phenolic substances, those having two or more hydroxyl groups in the molecule exhibit especially favorable effects.

The thermosensitive paper of this invention is obtained in a customary way by dispersing a generally colorless or slightly colored color former, a phenolic substance, etc. in a binder solution, coating the dispersion uniformly on a support, and drying. The substances to be dispersed are ground, in a grinder such as ball mill or the like, preferably as finely as possible (for example, a particle diameter of 5$\mu$ or less). Coarse particles result in not only a commercially less acceptable rough surface product, but also an occasional sourse for pressure-induced color development. If necessary, surface active agents such as dispersants or defoamers may be added to facilitate grinding. Filler materials such as talc, clay, starch and the like can be incorporated to increase brightness or to keep the thermal head from adhesion of the coating layer during thermal impression. Surface active agents can be added to improve application quality of the coating composition. In order to reduce the pressure-induced color development due to scratching, rubbing or applied pressure, which results in ground stains, the coating dispersion may contain waxes which have been ground as fine as the color former and the phenolic compound or dispersed in the form of emulsion.

The binder to be used is generally a water-soluble polymer such as starch, polyvinyl alcohol, carboxymethylcellulose, styrene-maleic acid copolymer, hydroxyethylcellulose or casein. Thermally fusible substances are unsuitable, because of their adhesion tendency to the thermal head.

The coating layer is applied by means of an air knife, rubber blade, steel blade, roller, or extrusion-type coater head. Drying of the coating layer is carried out at a comparatively low temperature. The thermosensitive paper thus obtained is insufficient in surface smoothness and cannot exhibit satisfactory performance characteristics because of insufficiency in close contact with the thermal head and, hence, in heat transfer. Therefore, the surface smoothness is increased by use of a machine calender, super calender, gloss calender or brush calender.

The invention is illustrated below with reference to Examples. In the examples, the impressed image density was measured by means of "Sakura" photoelectric densitometer PDA-30 (measurement was made on a circular area, 5 mm in diameter). Reproducibility of the heater dot on the thermosensitive paper was visually evaluated from a close-range photograph (×3, approximately) taken by a camera fitted up with a ring for close-range photographing. o:good; x:rather bad; ◎: excellent.

EXAMPLE 1

| | Parts by weight |
|---|---|
| Liquid A: | |
| 3-Piperidino-6-methyl-7-anilinofluorane | 1 |
| 5% Aqueous hydroxyethylcellulose solution | 5 |
| Liquid B: | |
| 4,4'-Isopropylidenediphenol | 1 |
| 5% Aqueous hydroxyethylcellulose solution | 5 |
| Liquid C: | |
| Fatty acid amide S (stearic acid amide of Nitto Chemical Co.) | 1 |
| 5% Aqueous hydroxyethylcellulose solution | 5 |

Each liquid was ground for 2 days in a ball mill. A thermosensitive coating liquid was prepared by mixing the above liquids in a weight ratio of A:B:C=1:5:3. The coating liquid was applied by means of an air-knife coater onto LK (a cast-coated paper of Mitsubishi Paper Mills Co.; 70 g/m$^2$) at an application rate of 5 g/m$^2$ on dry basis and dried at a temperature not exceeding 60° C. The thermosensitive paper was treated with a super calendar to impart it a Bekk smoothness of 200 to 300 seconds. The paper was impressed by means of a thermal head (time of current supply: 2.4 mmsec; voltage: 10 V). The impressed image density and the reproducibility of the heating element on the thermosensitive paper were very good as shown in Table 1.

Since the impressed image density measured by a densitometer is an average density in a circular area, 5 mm in diameter, a low measured density indicates non-uniform image and a higher density indicates more uniform image.

The rating of reproducibility is the result of visual evaluation. A lower rating riginates in local fluctuation of the coating layer density as well as non-uniform contact of the thermosensitive paper with the thermal head. The difference in the rating is pronounced especially in the case of high-speed impression.

TABLE 1

| Support | Density of impressed image | Reproducibility of heater dot | Average Bekk smoothness of base Paper (sec.) |
|---|---|---|---|
| Wood free paper | 0.96 | x | 50 |
| LK (cast-coated paper) | 1.15 | ◎ | 100 |
| Baryta paper (base paper for photographic printing paper) | 1.20 | ○ | 150 |
| Resin-coated paper (polyethylene-laminated base paper for photographic printing paper) | 1.17 | ○ | 160 |
| Pearl Coat (coated paper) | 1.11 | ○ | 250 |

As is apparent from the above table, the impressed image density and the reproducibility of heater dot on the thermosensitive paper were markedly improved by the use of an undercoated paper as the support. Above all, reproducibility of the heater dot became especially better when a cast-coated paper was used as the support.

What is claimed is:

1. In a thermosensitive recording paper comprising a support and, supported thereon, a combination of a colorless or slightly colored lactone compound color former and phenolic compound capable of rendering said lactone compound to develop color, the improvement whereby the printing quality is improved, which improvement is characterized in that said support is a cast coated paper having a Bekk smoothness of 80 seconds or more.

2. The thermosensitive recording paper of claim 1 wherein the cast-coated paper has a specular finish.

* * * * *